United States Patent
Xi et al.

(10) Patent No.: US 12,513,776 B2
(45) Date of Patent: Dec. 30, 2025

(54) METHOD FOR FREQUENCY ADJUSTMENT, TERMINAL, AND STORAGE MEDIUM

(71) Applicant: SPREADTRUM COMMUNICATIONS (SHANGHAI) CO., LTD., Shanghai (CN)

(72) Inventors: Jun Xi, Shanghai (CN); Weifeng Chen, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 480 days.

(21) Appl. No.: 18/008,249

(22) PCT Filed: Apr. 16, 2021

(86) PCT No.: PCT/CN2021/087814
§ 371 (c)(1),
(2) Date: Dec. 5, 2022

(87) PCT Pub. No.: WO2021/244157
PCT Pub. Date: Dec. 9, 2021

(65) Prior Publication Data
US 2023/0217539 A1    Jul. 6, 2023

(30) Foreign Application Priority Data

Jun. 4, 2020    (CN) .......................... 202010500676.2

(51) Int. Cl.
*H04W 76/28* (2018.01)
*H04W 24/02* (2009.01)

(52) U.S. Cl.
CPC .......... *H04W 76/28* (2018.02); *H04W 24/02* (2013.01)

(58) Field of Classification Search
CPC ..... H04W 76/28; H04W 24/02; H04W 76/27; Y02D 30/70
See application file for complete search history.

(56) References Cited

U.S. PATENT DOCUMENTS

| | | | |
|---|---|---|---|
| 10,567,145 B2 | 2/2020 | Zhou et al. | |
| 2013/0044609 A1* | 2/2013 | Chen | H04W 4/60 370/252 |

(Continued)

FOREIGN PATENT DOCUMENTS

| | | |
|---|---|---|
| CN | 106793019 A | 5/2017 |
| CN | 107852631 A | 3/2018 |

(Continued)

OTHER PUBLICATIONS

3GPP TSG RAN Meeting #84; RP-191304; Source: vivo, China Telecom, CAICT, Xiaomi, CMCC, Charter Communications, China Unicom, Samsung; Title: Considerations on multi-SIM study in RAN; Newport Beach, USA, Jun. 3-6, 2019 (Year: 2019).*

(Continued)

*Primary Examiner* — Mohammed S Chowdhury
(74) *Attorney, Agent, or Firm* — HAUPTMAN HAM, LLP

(57) ABSTRACT

A method for frequency adjustment, a terminal, and a storage medium are provided. In the method, the terminal obtains state information of the terminal, where the state information indicates a movement state and/or a service state of the terminal, and adjusts an idle-state-measurement frequency of a non-data card of the terminal according to the state information of the terminal.

17 Claims, 7 Drawing Sheets

(56) References Cited

U.S. PATENT DOCUMENTS

| | | | |
|---|---|---|---|
| 2018/0184452 A1* | 6/2018 | Bitra | H04W 72/1215 |
| 2018/0220329 A1* | 8/2018 | Arumugam | H04L 65/1073 |
| 2020/0374785 A1* | 11/2020 | Li | H04W 8/24 |
| 2021/0281999 A1* | 9/2021 | Cui | H04W 88/06 |

FOREIGN PATENT DOCUMENTS

| | | |
|---|---|---|
| CN | 108012257 A | 5/2018 |
| CN | 108271126 A | 7/2018 |
| WO | 2019061309 A1 | 4/2019 |

OTHER PUBLICATIONS

SA WG2 Meeting #136AH; S2-2000116; Source: Qualcomm Incorporated, apple, vivo, CATT; Title: Solution for paging collision avoidance; Jan. 13-17, 2020, Incheon, Korea (was S2-1912399); See §1, §2. (Year: 2020).*

WIPO, International Search Report and Written Opinion for International Application No. PCT/CN2021/087814, Jul. 9, 2021.

The first office action issued in corresponding CN application No. 202010500676.2 dated Jun. 9, 2022.

The second office action issued in corresponding CN application No. 202010500676.2 dated Oct. 27, 2022.

* cited by examiner

METHOD FOR FREQUENCY ADJUSTMENT, TERMINAL, AND STORAGE MEDIUM

CROSS-REFERENCE TO RELATED APPLICATION(S)

This application is a National Stage of International Application No. PCT/CN2021/087814, field Apr. 16, 2021, which claims priority to Chinese Patent Application No. 202010500676.2, filed Jun. 4, 2020, the disclosures of which are hereby incorporated by reference in their entirety.

TECHNICAL FIELD

The disclosure relates to the field of mobile communication technology, and in particular, to a method for frequency adjustment, a terminal, and a storage medium.

BACKGROUND

With the rapid development of wireless communication technology, more and more users have two subscriber identity module (SIM) cards to meet the requirements for different communication occasions. For example, one SIM card (i.e., a data card) can be used to transmit data, and the other SIM card (i.e., a non-data card) can be used to page/receive system messages. However, considering the manufacturing cost of the mobile terminal, the data card and the non-data card in the existing mobile terminal shares a set of radio frequency (RF) system. The non-data card can perform idle-state measurement with discontinuous reception (DRX). When performing idle-state measurement, the non-data card may compete with the data card for RF resources. If the data card transmits data at the same time, the data transmission rate of the data card will be affected. In this case, how to improve the data transmission rate of the data card is an open problem at present.

SUMMARY

In a first aspect, implementations of the disclosure provide a method for frequency adjustment. The method includes: obtaining state information of a terminal, where the state information indicates a movement state and/or a service state of the terminal, and adjusting an idle-state-measurement frequency of a non-data card of the terminal according to the state information of the terminal.

In a second aspect, implementations of the disclosure provide a terminal. The terminal includes a memory configured to store one or more programs, and a processor configured to invoke and execute the one or more programs to perform the method of the first aspect.

In a third aspect, implementations of the disclosure provide a computer-readable storage medium. The computer-readable storage medium stores computer programs which are operable with a processor to perform the method of the first aspect.

BRIEF DESCRIPTION OF THE DRAWINGS

To describe technical solutions of implementations of the disclosure or the related art more clearly, the following briefly introduces the drawings required for implementations. Apparently, the drawings in the following description are merely some implementations of the disclosure. Those of ordinary skill in the art may also obtain other drawings based on these drawings without creative efforts.

DETAILED DESCRIPTION

Technical solutions in implementations of the disclosure will be described clearly and completely below with reference to the drawings in implementations of the disclosure. Apparently, the described implementations are only a part of rather than all of implementations of the disclosure. Based on implementations of the disclosure, all other implementations obtained by those of ordinary skill in the art without creative efforts shall fall within the protection scope of the disclosure.

It should be noted that, in the specification, claims, and drawings of the disclosure, terms such as "first", "second" are intended to distinguish between similar objects, but do not necessarily indicate a specific order or sequence. It should be understood that the data used in such a way are interchangeable in proper circumstances, so that implementations of the application described herein can be implemented in other sequences than the order illustrated or described herein. In addition, terms "comprising" and "including" and any variations thereof are intended to cover non-exclusive inclusions, for example, a process, method, system, product, or server including a series of steps or modules is not necessarily limited to those clearly listed steps or modules, but may include other steps or modules that are not clearly listed or are inherent to these processes, methods, products, or devices.

Methods in implementations of the disclosure are applicable to mobile terminals, such as user equipment (UE), smart phones, tablet computers, wearable terminals with wireless communication functions, such as smart watches, customer premise equipment (CPE), and module devices with wireless communication functions. For the convenience of description, the mobile terminal may also be referred to as a terminal.

In some possible implementations, the terminal may be a dual-card terminal. A dual-card terminal has two card slots and can hold two cards at the same time. The two cards may belong to the same operator or two different operators. Among these two cards, one card (i.e., a data card) can be used to transmit data, and the other card (i.e., a non-data card) can be in a standby state and used to page/receive system messages.

Figure 1:
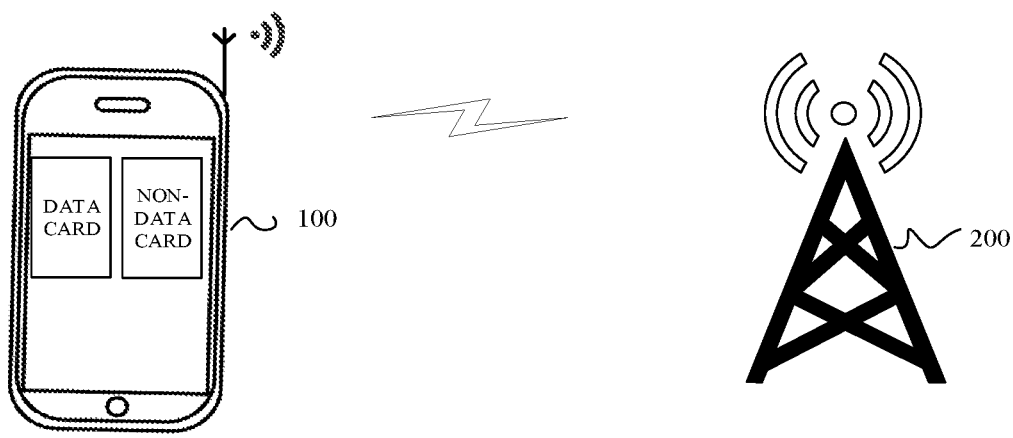
FIG. 1 is a schematic diagram of a network system provided in implementations of the disclosure.

In some possible implementations, the terminal may establish a communication connection with a network device. Referring to FIG. 1, FIG. 1 is a schematic diagram of a network system provided in implementations of the disclosure. The network system includes a terminal 100 and a network device 200. The terminal 100 holds a data card and a non-data card. The data card and non-data card in the terminal 100 both support communication.

For example, the terminal may establish a communication connection with the network device 200 through global system for mobile communications (GSM), general packet radio services (GPRS), code division multiple access (CDMA), wideband code division multiple access (WCDMA), time-division code division multiple access (TD-SCDMA), long term evolution (LTE), 5th generation (5G) mobile networks, wireless local area networks (WLAN), wireless fidelity (Wi-Fi) networks, etc., which is not limited herein.

The network device 200 is a device that provides wireless communication functions for the terminal. The network device may be a gNodeB (gNB), an evolved node B (eNB), a node B (eNB), a radio network controller (RNC), abase station controller (BSC), abase transceiver station (BTS), a base band unit (BBU), a transmitting and receiving point (TRP), a transmitting point (TP), a mobile switching centers, etc. in 5G, which is not limited herein.

In the dual-card terminal, the network coverage of the data card may be different from the network coverage of the non-data card. The network coverage may be indicated via a reference signal receiving power (RSRP) and a signal to interference plus noise ratio (SINR). For example, when RSRP>75 dBm and SINR>25 dB, the network coverage is good, and when RSRP<105 dBm and SINR<5 dB, the network coverage is poor.

Terminals in different locations may have different network coverages. For example, the network coverage of the data card and the non-data card in a terminal on the ground is better than that of the data card and the non-data card in a dual-card terminal in a basement.

For one dual-card terminal, the network coverage of the data card may be different from the network coverage of the non-data card. For example, if the data card and the non-data card in the dual-card terminal belong to two different operators, the network coverage of the data card may be different from the network coverage of the non-data card.

When the network coverage of the data card is good and the network coverage of the non-data card is poor, the data card can transmit data without triggering measurement, and the non-data card needs to switch to a cell with better network coverage and trigger idle-state measurement.

In some possible implementations, the idle-state measurement may refer to inter-frequency/inter-system measurement in a discontinuous reception (DRX) cycle. The non-data card can apply to the data card for a measurement gap, i.e., to reserve a time period. During this time period, the terminal tunes the receiver to a frequency point of the target cell of the non-data card and receives information of the target cell.

In some possible implementations, when the non-data card triggers idle-state measurement, the network device will issue a measurement parameter according to the network configuration and the software and hardware configuration of the terminal. The measurement parameter indicates the number of frequency points, N, at which the non-data card performs inter-frequency/inter-system measurement in each idle mode DRX cycle.

Figure 2:
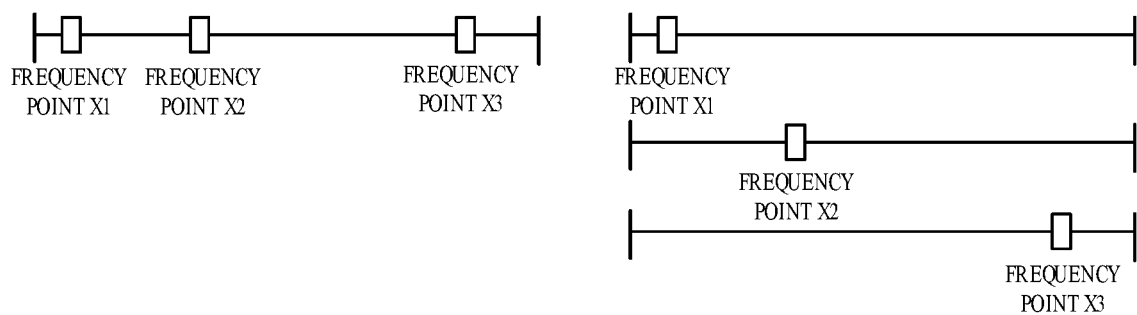
FIG. 2 is a schematic diagram illustrating different idle-state-measurement frequencies provided in implementations of the disclosure.

In some possible implementations, the frequency of idle-state measurement performed by the non-data card of the terminal is variable, that is, the number of times the receiver tunes to a frequency point of the target cell of the non-data card in one DRX cycle is variable. Referring to FIG. 2, FIG. 2 illustrates two different idle-state-measurement frequencies. It is assumed that frequency points of the target cell of the non-data card of the terminal are X1, X2, and X3.

As illustrated in the left part of FIG. 2, the non-data card can apply to the data card for three measurement gaps in one DRX cycle, and then tune the receiver to the three frequency points of the target cell of the non-data card in the three measurement gaps, to receive information of the target cell.

As illustrated in the right part of FIG. 2, the non-data card can apply to the data card for one measurement gap in each of three DRX cycles, and then tune the receiver to the three frequency points of the target cell of the non-data card in the three measurement gaps, to receive information of the target cell. It can be seen that, the idle-state-measurement frequency in the left part of FIG. 2 is higher than that in the right part.

In order to save costs, the data card and the non-data card may share a set of radio frequency (RF) system, and the non-data card may compete with the data card for RF resources. When the non-data card performs inter-frequency/inter-system measurement, the higher the measurement frequency, the more RF resources the non-data card occupies per unit time, the higher the data transmission rate loss of the data card, and the lower the data transmission rate of the data card. Therefore, how to improve the data transmission rate of the data card is an open problem at present.

Implementations of the disclosure provide a method and an apparatus for frequency adjustment and a terminal. In the method, a terminal obtains state information of the terminal, where the state information indicates a movement state and/or a service state of the apparatus, and reduces an idle-state-measurement frequency of a non-data card of the terminal according to the state information of the terminal, thereby reducing the data transmission rate loss of a data card, improving the data transmission rate of the data card, and ensuring the user experience.

In some possible implementations, N frequency points are configured by a network device for the non-data card of the terminal. In implementations of the disclosure, the idle-state-measurement frequency of the non-data card is reduced, that is, N measurement frequency points of the non-data card completed in one DRX cycle are changed to be completed in N DRX cycles.

A method for frequency adjustment in implementations of the disclosure will be described in detail below.

Figure 3:
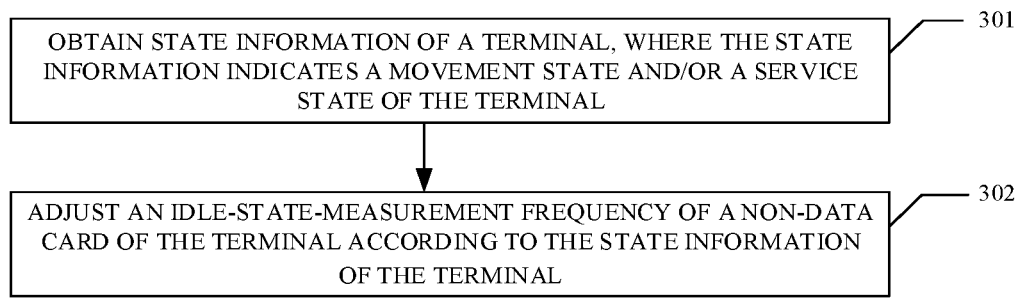
FIG. 3 is a schematic flowchart of a method for frequency adjustment provided in implementations of the disclosure.

Referring to FIG. 3, FIG. 3 is a schematic flowchart of a method for frequency adjustment provided in implementations of the disclosure. The method may include S301 to S302.

S301: Obtain state information of a terminal, where the state information indicates a movement state and/or a service state of the terminal.

In some possible implementations, the state information of the terminal may be obtained periodically. To ensure data integrity, a period T may be greater than or equal to N*TDRX, where N indicates the number of frequency points configured by the network device for the non-data card, and TDRX indicates a DRX cycle. For example, eight frequency points are configured by the network device for the non-data card, the DRX cycle is 320 ms, and the period T can be 3 ms, which is merely for illustrative purpose and should not be construed as limiting.

In some possible implementations, the state information may include a movement speed of the terminal, and the movement speed of the terminal may indicate the movement state of the terminal.

In some possible implementations, the terminal can obtain the movement speed of the terminal through a global positioning system (GPS) module or a BeiDou navigation satellite system (BDS) module of the terminal, which is not limited herein.

In some possible implementations, the state information may also indicate the service state of the terminal, and the state information may include one or more of: a data transmission rate, a throughput, and a data transmission application.

The data transmission rate includes an uplink (UL) data transmission rate, a downlink (DL) data transmission rate, a UL-DL data concurrent rate, and the like. For example, the UL data transmission rate may indicate the service state of the terminal. For another example, the UL-DL data concurrent rate may indicate the service state of the terminal.

The throughput includes a UL throughput, a DL throughput, and the like. For example, the UL throughput may indicate the service state of the terminal.

The data transmission application includes a video application, a file application, a web application, and the like. For example, the video application may indicate the service state of the terminal.

For the convenience of description, the data transmission rate is used for illustration in implementations of the disclosure.

The terminal can obtain the data transmission rate of the data card through a modem in the terminal.

S302: Adjust an idle-state-measurement frequency of a non-data card of the terminal according to the state information of the terminal.

In some possible implementations, a threshold related to the state information may be pre-stored in the terminal. When the state information of the terminal includes a movement speed and/or a data transmission rate of the terminal, a first threshold and/or a second threshold may be pre-stored in the terminal.

The first threshold is the maximum value of the movement speed of the terminal in a low-speed movement state. That is, when the movement speed of the terminal is less than or equal to the first threshold, the terminal is in the low-speed movement state.

In some possible implementations, the first threshold may be set according to the walking speed of the user.

The second threshold is the minimum value of the data transmission rate of the terminal in a high-speed service state. That is, when the data transmission rate of the terminal is greater than or equal to the second threshold, the terminal is in the high-speed service state.

In some possible implementations, the second threshold may be set according to the network system. When the data card of the terminal is in different network systems, different second thresholds may be set. For example, the second threshold of the data card in a frequency division duplexing (FDD)-LTE system is greater than the second threshold of the data card in a time division duplexing (TDD)-LTE system.

In some possible implementations, the obtained state information of the terminal is compared with the first threshold and/or the second threshold. When a preset condition is met, the idle-state-measurement frequency of the non-data card of the terminal is reduced, that is, the number of times the non-data card receives information of a target cell with the receiver in one DRX cycle is reduced.

A detailed illustration is given below.

In an example, the terminal may determine the idle-state-measurement frequency of the non-data card according to the movement state of the terminal.

In some possible implementations, the first threshold is pre-stored in the terminal. When the non-data card triggers idle-state measurement, if the movement speed of the terminal is less than or equal to the first threshold, the terminal satisfies a preset movement state. The terminal can control the non-data card to complete measurement of the N frequency points in N DRX cycles.

For example, the current movement speed of the terminal is 0.1 m/s, the first threshold preset by the terminal is 1 m/s, and the non-data card of the terminal needs to complete measurement of eight frequency points. When the non-data card triggers idle-state measurement, the movement speed of the terminal is less than the first threshold, and the terminal satisfies the preset movement state, then the terminal can control the non-data card to complete measurement of the eight frequency points in eight DRX cycles respectively.

Satisfying the preset movement state may indicate that the terminal is in a low-speed movement state, the non-data card has a low real-time requirement for obtaining the information of the target cell, and reducing the idle-state-measurement frequency of the non-data card will not affect the normal operation of the non-data card.

In some other possible implementations, the first threshold is pre-stored in the terminal. When the non-data card triggers idle-state measurement, if the movement speed of the terminal is greater than the first threshold, the terminal fails to satisfy the preset movement state. The terminal can control the non-data card to complete measurement of the N frequency points in one DRX cycle.

For example, the current movement speed of the terminal is 2 m/s, the first threshold preset by the terminal is 1 m/s, and the non-data card of the terminal needs to complete measurement of eight frequency points. When the non-data card triggers idle-state measurement, the movement speed of the terminal is greater than the first threshold, and the terminal fails to satisfy the preset movement state, then the terminal can control the non-data card to complete measurement of the eight frequency points in one DRX cycle.

The failure to satisfy the preset movement state may indicate that the terminal is in a high-speed movement state, so that the non-data card has a high real-time requirement for obtaining the information of the target cell, and reducing the idle-state-measurement frequency of the non-data card may affect the normal operation of the non-data card.

In an example, the terminal may determine the idle-state-measurement frequency of the non-data card according to the service state.

In some possible implementations, the second threshold is pre-stored in the terminal. When the non-data card triggers idle-state measurement, the data transmission rate of the terminal is obtained. If the data transmission rate of the terminal is greater than or equal to the second threshold, the terminal satisfies a preset service state, and the terminal can control the non-data card to complete measurement of the N frequency points in N DRX cycles.

For example, the current data transmission rate of the terminal is 2 Mbps, the second threshold preset by the terminal is 1 Mbps, and the non-data card of the terminal needs to complete measurement of eight frequency points. When the non-data card triggers idle-state measurement, the data transmission rate of the terminal is greater than the second threshold, and the terminal satisfies the preset service state, then the terminal can control the non-data card to complete measurement of the eight frequency points in eight DRX cycles respectively.

In some possible implementations, the second threshold may include a UL data transmission rate threshold, a DL data transmission rate threshold, and a UL-DL data concurrent rate for threshold, which is not limited herein.

In some possible implementations, when performing different services, the terminal has different data transmission rates. The terminal may set different second thresholds according to different data transmission rates.

For example, when the terminal performs a video download service, the terminal has a large quantity of DL data, and the DL data transmission rate of the terminal is high. In this case, the second threshold may include a DL data transmission rate threshold.

For another example, when the terminal performs a file upload service, the terminal has a large quantity UL data, and the UL data transmission rate of the terminal is high. In this case, the second threshold may include a UL data transmission rate threshold.

For another example, when the terminal performs a live broadcast service, the terminal has a large quantity of UL data and DL data, and the UL data transmission rate and the DL data transmission rate of the terminal are high. In this case, the second threshold may include a UL-DL data concurrent rate threshold.

Satisfying the preset service state may indicate that the terminal is in a high-speed service state, so that the data card has a high requirement for the data transmission rate, and reducing the idle-state-measurement frequency of the non-data card can significantly improve the data transmission rate of the data card and ensure the user experience.

In some other possible implementations, the second threshold is pre-stored in the terminal. When the non-data card triggers idle-state measurement, if the data transmission rate of the terminal is less than the second threshold, the terminal fails to satisfy the preset service state, and the terminal can control the non-data card to complete measurement of the N frequency points in one DRX cycle.

For example, the current data transmission rate of the terminal is 0.1 Mbps, the second threshold preset by the terminal is 1 Mbps, and the non-data card of the terminal needs to complete measurement of eight frequency points. When the non-data card triggers idle-state measurement, the data transmission rate of the terminal is less than the second threshold, and the terminal fails to satisfy the preset service state, then the terminal can control the non-data card to complete measurement of the eight frequency points in one DRX cycle.

The failure to satisfy the preset service state may indicate that the terminal is in a low-speed service state, so that the data card has a low requirement for the data transmission rate, and there is no need to reduce the idle-state-measurement frequency of the non-data card.

In an example, the idle-state-measurement frequency of the non-data card is determined according to the movement state and the service state of the terminal. The idle-state-measurement frequency of the non-data card may be determined as follows. The movement state of the terminal is first determined, and then the service state of the terminal is determined.

In some possible implementations, the first threshold and the second threshold are pre-stored in the terminal. When the non-data card triggers idle-state measurement, if the movement speed of the terminal is less than or equal to the first threshold, the terminal satisfies the preset movement state. Then, the data transmission rate of the terminal is compared with the second threshold. If the data transmission rate of the terminal is greater than or equal to the second threshold, the terminal satisfies the preset service state. The terminal can control the non-data card to complete measurement of the N frequency points in N DRX cycles.

In some other possible implementations, the first threshold and the second threshold are pre-stored in the terminal. When the non-data card triggers idle-state measurement, if the movement speed of the terminal is greater than the first threshold, that is, the terminal fails to satisfy the preset movement state, there is no need to continue to determine whether the data transmission rate of the terminal satisfies the preset service state, and the terminal can control the non-data card to complete measurement of the N frequency points in one DRX cycle.

In some other possible implementations, the first threshold and the second threshold are pre-stored in the terminal. When the non-data card triggers idle-state measurement, if the movement speed of the terminal is less than or equal to the first threshold, the terminal satisfies the preset movement state. Then, the data transmission rate of the terminal is compared with the second threshold. If the data transmission rate of the terminal is less than the second threshold, that is, the terminal fails to satisfy the preset service state, the terminal can control the non-data card to complete measurement of the N frequency points in one DRX cycle.

The idle-state-measurement frequency of the non-data card may be determined as follows. The service state of the terminal is first determined, and then the movement state of the terminal is determined.

In some possible implementations, the first threshold and the second threshold are pre-stored in the terminal. When the non-data card triggers idle-state measurement, if the data transmission rate of the terminal is greater than or equal to the second threshold, the terminal satisfies the preset service state. Then, the movement speed of the terminal is compared with the first threshold. If the movement speed of the terminal is less than or equal to the first threshold, the terminal satisfies the preset movement state, and the terminal can control the non-data card to complete measurement of the N frequency points in N DRX cycles.

In some other possible implementations, the first threshold and the second threshold are pre-stored in the terminal. When the non-data card triggers idle-state measurement, if the data transmission rate of the terminal is less than the second threshold, the terminal fails to satisfy the preset service state, there is no need to continue to determine whether the movement state of the terminal satisfies the preset movement state, and the terminal can control the non-data card to complete measurement of the N frequency points in one DRX cycle.

In some other possible implementations, the first threshold and the second threshold are pre-stored in the terminal. When the non-data card triggers idle-state measurement, if the data transmission rate of the terminal is greater than or equal to the second threshold, the terminal satisfies the preset service state. Then, the movement speed of the terminal is compared with the first threshold. If the movement speed of the terminal is greater than the first threshold, the terminal fails to satisfy the preset movement state, and the terminal can control the non-data card to complete measurement of the N frequency points in one DRX cycle.

It can be seen that, according to the description of S301 and S302 in above implementations, the terminal can improve the data transmission rate of the data card by reducing the idle-state-measurement frequency of the non-data card. An example is given below through theoretical calculation of the LTE dual-card rate.

Referring to Table 1, Table 1 illustrates influences of different idle-state-measurement frequencies on the data transmission rate of the data card in the LTE system. It can be seen from Table 1 that, compared with the related art, with the method in implementations of the disclosure, the data transmission rate loss of the data card can be reduced, and the data transmission rate of the data card can be improved. As illustrated in Table 1:

TABLE 1

Influences of different idle-state-measurement frequencies on the data transmission rate of the data card in the LTE system

| | network coverage of the data card is good, and network coverage of the non-data card is poor | |
|---|---|---|
| measurement times in one DRX cycle by the non-data card | 8 | 1 |
| DRX cycle of the non-data card | 320 ms | 320 ms |
| paging reception | 10 ms | 10 ms |
| system message reception | 3 ms | 3 ms |
| inter-frequency/inter-system measurement | 8 * 6 ms = 48 ms | 6 ms |
| total task overhead | 61 ms | 19 ms |
| symbol overhead | 0.41 | 0.31 |
| data transmission rate of data card in dual-card terminal/data transmission rate of data card in single-card terminal | 76% | 94% |
| lost data transmission rate | 24% | 6% |

With reference to Table 1, it can be seen that, in the LTE system, when the idle-state-measurement frequency of the non-data card is changed from eight measurement frequency points in one DRX cycle to one measurement frequency point in each of eight DRX cycles, the data transmission rate loss of the data card is reduced from 24% to 6%, and the data transmission rate of the data card is increased by 18%.

In implementations of the disclosure, after obtaining the state information, the terminal determines the idle-state-measurement frequency of the non-data card according to the movement state and/or the service state indicated in the state information. When the state information satisfies a preset state, the terminal can reduce the idle-state-measurement frequency of the non-data card, which reduces the data transmission rate loss of the data card and improves the data transmission rate of the data card, thereby ensuring the user experience.

Method implementations described with reference to FIG. 3 are described with reference to FIGS. 4A to 4D in detail.

Figure 4A:
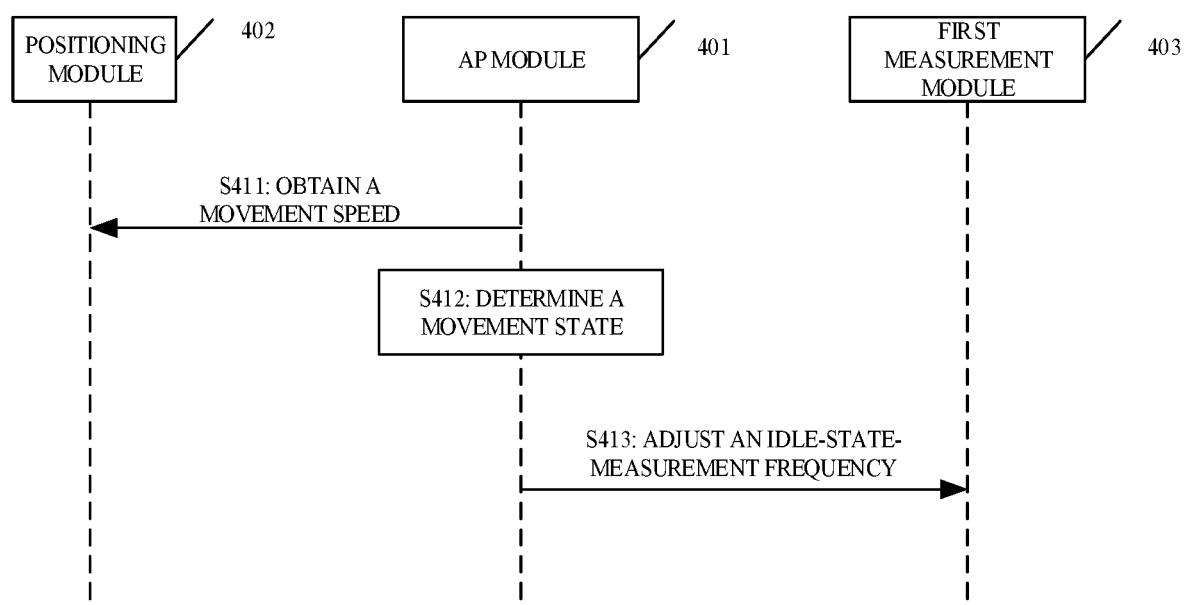
FIGS. 4A to 4D are schematic flowcharts of another method for frequency adjustment provided in implementations of the disclosure.

In an example, N measurement frequency points are delivered by the network device to the terminal. The terminal includes an application processor (AP) module 401, a positioning module 402, and a first measurement module 403. The first measurement module 403 includes a non-data card. Referring to FIG. 4A, FIG. 4A is a schematic flowchart of another method for frequency adjustment provided in implementations of the disclosure. The method includes the following.

S411: The AP module obtains a movement speed from the positioning module.

When a data service is initiated, the AP module periodically obtains the movement speed from the positioning module.

S412: The AP module determines a movement state.

A first threshold is pre-stored in the AP module, and the AP module compares the obtained movement speed with the first threshold to determine the movement state.

S413: The AP module adjusts an idle-state-measurement frequency of the first measurement module.

The AP module will perform different operations according to a determination result of the AP module on the movement state.

S413a: The AP module reduces the idle-state-measurement frequency of the first measurement module if a preset movement state is satisfied.

If the preset movement state is satisfied, that is, the movement speed is less than or equal to the first threshold, the AP module transmits an instruction to the first measurement module, where the instruction indicates to reduce the idle-state-measurement frequency of the first measurement module. That is, only 1*6 ms measurement gap is applied for in each DRX cycle, and measurement of the N frequency points is completed in N cycles.

S413b: The AP module maintains the idle-state-measurement frequency of the first measurement module if the preset movement state is not satisfied.

If the preset movement state is not satisfied, that is, the movement speed is greater than the first threshold, the AP module transmits an instruction to the first measurement module, where the instruction indicates to maintain the idle-state-measurement frequency of the first measurement module. That is, N*6 ms measurement gaps are applied for in one cycle, and measurement of the N frequency points is completed in one cycle.

It should be noted that S413a and S413b are two parallel steps, and whether to execute S413a or S413b is determined according to the determination result of the movement state of the terminal.

Optionally, after a preset time period, such as a period T, the AP module determines the movement state again. If the preset movement state is satisfied, the first measurement module is controlled to apply for only 1*6 ms measurement gap in each cycle, and measurement of the N frequency points is completed in N cycles. If the preset movement state is not satisfied, the AP controls the first measurement module to apply for N*6 ms measurement gaps in one cycle, and measurement of the N frequency points is completed in one cycle.

In implementations of the disclosure, after obtaining the state information, the terminal determines the idle-state-measurement frequency of the non-data card according to the movement state indicated in the state information. When the state information satisfies the preset movement state, the terminal can reduce the idle-state-measurement frequency of the non-data card, which reduces the data transmission rate loss of the data card and improves the data transmission rate of the data card, thereby ensuring the user experience.

In an example, N measurement frequency points are delivered by the network device to the terminal. The terminal includes a first measurement module 403, a modem 404, and a second measurement module 405. The first measurement module 403 includes a non-data card, and the second measurement module 405 includes a data card.

Figure 4B:
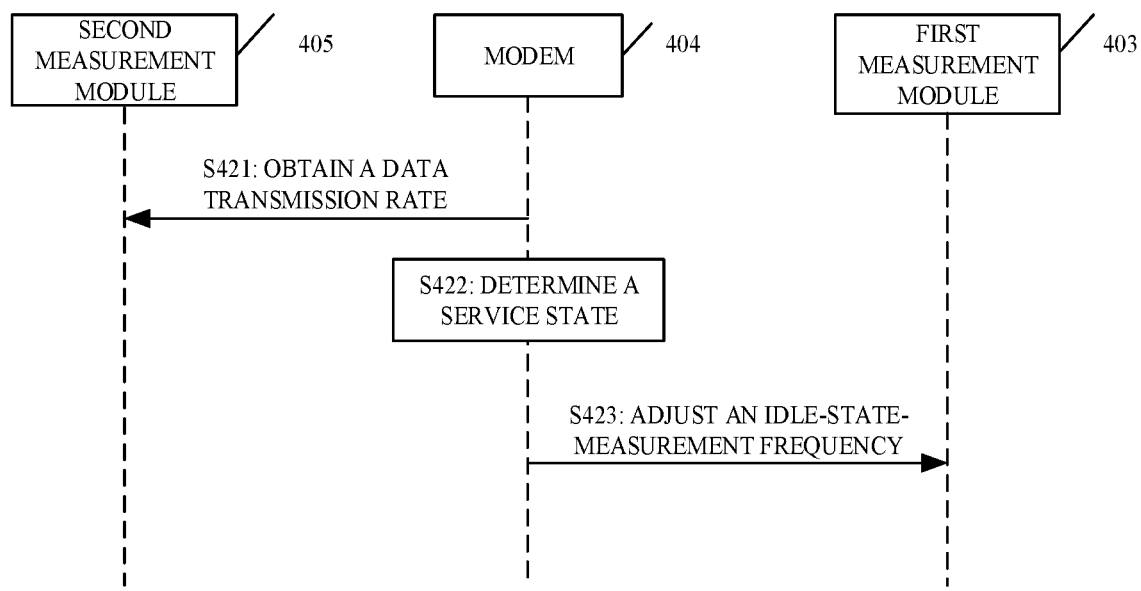

Referring to FIG. 4B, FIG. 4B is a schematic flowchart of another method for frequency adjustment provided in implementations of the disclosure. The method includes the following.

S421: The modem obtains a data transmission rate from the second measurement module.

When a data service is initiated, the modem periodically obtains the data transmission rate from the second measurement module.

S422: The modem determines a service state.

A second threshold is pre-stored in the modem, and the modem compares the obtained data transmission rate with the second threshold to determine the service state.

S423: The modem adjusts an idle-state-measurement frequency of the first measurement module.

The modem will perform different operations according to a determination result of the modem on the service state.

S423a: The modem reduces the idle-state-measurement frequency of the first measurement module if a preset service state is satisfied.

If the preset service state is satisfied, that is, the data transmission rate is greater than or equal to the second threshold, the modem transmits an instruction to the first measurement module, where the instruction indicates to reduce the idle-state-measurement frequency of the first measurement module. That is, only 1*6 ms measurement gap is applied for in each cycle, and measurement of the N frequency points is completed in N cycles.

S423b: The modem maintains the idle-state-measurement frequency of the first measurement module if the preset service state is not satisfied.

If the preset service state is not satisfied, that is, the data transmission rate is less than the second threshold, the modem transmits an instruction to the first measurement module, where the instruction indicates to maintain the idle-state-measurement frequency of the first measurement module. That is, N*6 ms measurement gaps are applied for in one cycle, and measurement of the N frequency points is completed in one cycle.

It should be noted that S423a and S423b are two parallel steps, and whether to execute S423a or S423b is determined according to the determination result of the service state.

Optionally, after a preset time period, such as a period T, the modem determines the service state again. If the preset service state is satisfied, the first measurement module is controlled to apply for only 1*6 ms measurement gap in each cycle, and measurement of the N frequency points is completed in N cycles. If the preset service state is not satisfied, the modem controls the first measurement module to apply for N*6 ms measurement gaps in one cycle, and measurement of the N frequency points is completed in one cycle.

In implementations of the disclosure, after obtaining the state information, the terminal determines the idle-state-measurement frequency of the non-data card according to the service state indicated in the state information. When the state information satisfies the preset service state, the terminal can reduce the idle-state-measurement frequency of the non-data card, which reduces the data transmission rate loss of the data card and improves the data transmission rate of the data card, thereby ensuring the user experience.

In an example, N measurement frequency points are delivered by the network device to the terminal. The terminal includes an AP module 401, a positioning module 402, a first measurement module 403, a modem 404, and a second measurement module 405. The first measurement module 403 includes a non-data card, and the second measurement module 405 includes a data card.

Figure 4C:
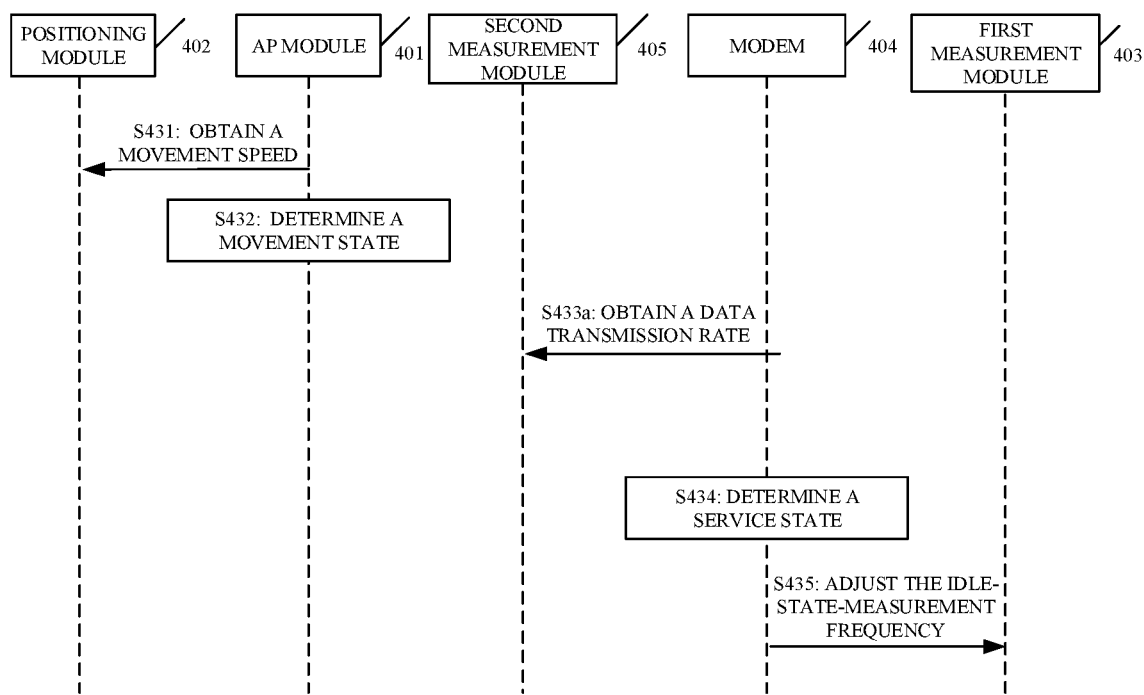

Referring to FIG. 4C, FIG. 4C is a schematic flowchart of another method for frequency adjustment provided in implementations of the disclosure. The method includes the following.

S431: The AP module obtains a movement speed from the positioning module. Reference can be made to S411 for details.

S432: The AP module determines a movement state. Reference can be made to S412 for details.

S433a: The modem obtains a data transmission rate from the second measurement module if a preset movement state is satisfied.

S433b: The AP module transmits an instruction to the first measurement module if the preset movement state is not satisfied, where the instruction indicates to maintain an idle-state-measurement frequency of the first measurement module. That is, N*6 ms measurement gaps are applied for in one cycle, and measurement of the N frequency points is completed in one cycle.

It should be noted that S433a and S433b are two parallel steps, and whether to execute S433a or S433b is determined according to the determination result of the movement state.

If S433a is executed, continue to execute S434. If S433b is executed, the method ends.

S434: The modem determines a service state. Reference can be made to S422 for details.

S435: The modem adjusts the idle-state-measurement frequency of the first measurement module. Reference can be made to S423 for details.

Optionally, after a preset time period, such as a period T, the AP module and the modem determine the state information again. If the preset movement state and the preset service state are satisfied, the first measurement module is controlled to apply for only 1*6 ms measurement gap in each cycle, and measurement of the N frequency points is completed in N cycles. If the preset movement state or the preset service state is not satisfied, the first measurement module is controlled to apply for N*6 ms measurement gaps in one cycle, and measurement of the N frequency points is completed in one cycle.

In implementations of the disclosure, after obtaining the state information, the terminal determines the idle-state-measurement frequency of the non-data card according to the movement state and the service state indicated in the state information. When the movement state and the service state satisfy the preset condition, the terminal can reduce the idle-state-measurement frequency of the non-data card, which reduces the data transmission rate loss of the data card and improves the data transmission rate of the data card, thereby ensuring the user experience.

In an example, N measurement frequency points are delivered by the network device to the terminal. The terminal includes an AP module 401, a positioning module 402, a first measurement module 403, a modem 404, and a second measurement module 405. The first measurement module 403 includes a non-data card, and the second measurement module 405 includes a data card.

Figure 4D:
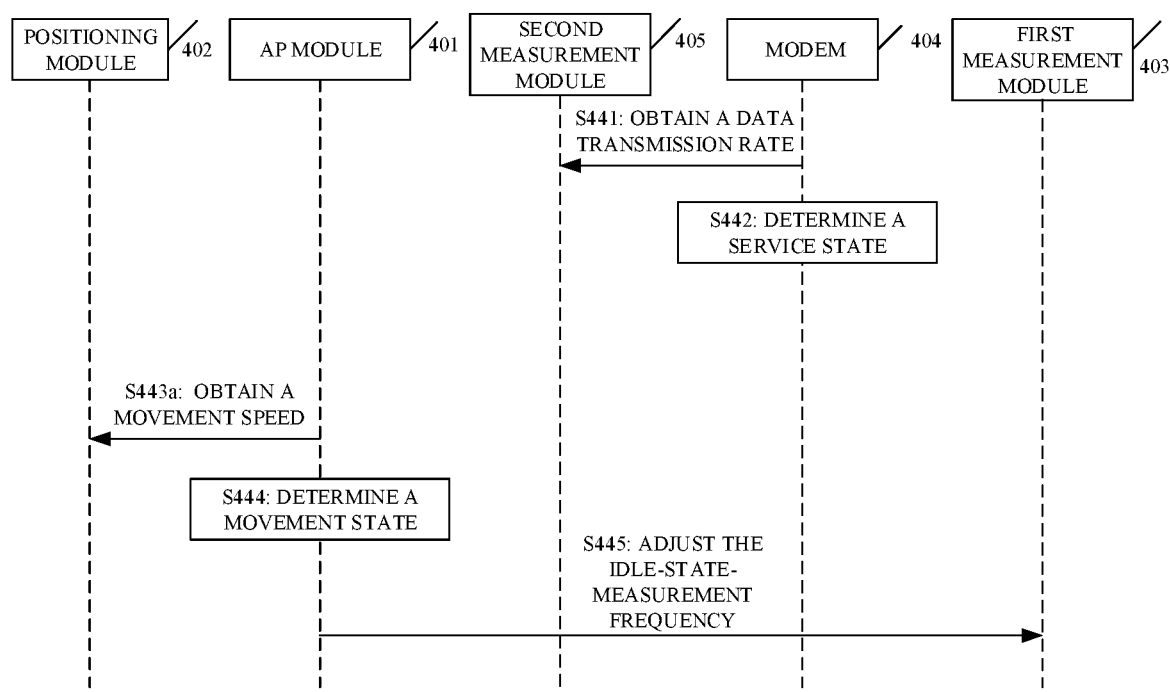

Referring to FIG. 4D, FIG. 4D is a schematic flowchart of another method for frequency adjustment provided in implementations of the disclosure. The method includes the following.

S441: The modem obtains a data transmission rate from the second measurement module.

Reference can be made to S421 for details.

S442: The modem determines a service state. Reference can be made to S422 for details.

S443a: The AP module obtains a movement speed from the positioning module if a preset service state is satisfied.

S443b: The modem transmits an instruction to the first measurement module if the preset service state is not satisfied, where the instruction indicates to maintain an idle-state-measurement frequency of the first measurement module. That is, N*6 ms measurement gaps are applied for in one cycle, and measurement of the N frequency points is completed in one cycle.

It should be noted that S443a and S443b are two parallel steps, and whether to execute S443a or S443b is determined according to the determination result of the service state.

If S443a is executed, continue to execute S444. If S443b is executed, the method ends.

S444: The AP module determines a movement state. Reference can be made to S412 for details.

S445: The AP module adjusts the idle-state-measurement frequency of the first measurement module. Reference can be made to S413 for details.

Optionally, after a preset time period, such as a period T, the modem and the AP module determine the state information again. If the preset service state and the preset movement state are satisfied, the first measurement module is controlled to apply for only 1*6 ms measurement gap in each cycle, and measurement of the N frequency points is completed in N cycles. If the preset service state or the preset movement state is not satisfied, the first measurement module is controlled to apply for N*6 ms measurement gaps in one cycle, and measurement of the N frequency points is completed in one cycle.

In implementations of the disclosure, after obtaining the state information, the terminal determines the idle-state-measurement frequency of the non-data card according to the movement state and the service state indicated in the state information. When the movement state and the service state satisfy the preset condition, the terminal can reduce the idle-state-measurement frequency of the non-data card, which reduces the data transmission rate loss of the data card and improves the data transmission rate of the data card, thereby ensuring the user experience.

Figure 5:
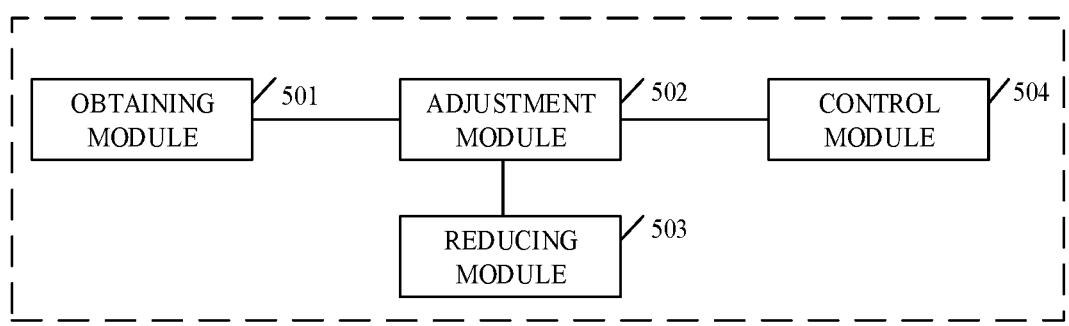
FIG. 5 is a schematic structural diagram of an apparatus for frequency adjustment provided in implementations of the disclosure.

The following describes an apparatus for frequency adjustment provided in implementations of the disclosure in detail. FIG. 5 is a schematic structural diagram of an apparatus for frequency adjustment provided in implementations of the disclosure. As illustrated in FIG. 5, the apparatus described in implementations includes an obtaining module 501 and an adjustment module 502, and may further include a reducing module 503 and a control module 504. The obtaining module 501 is configured to obtain state information of the apparatus, where the state information indicates a movement state and/or a service state of the apparatus. The adjustment module 502 is configured to adjust an idle-state-measurement frequency of a non-data card of the apparatus according to the state information of the apparatus.

Optionally, the obtaining module 501 may be further configured to obtain a data transmission rate of the apparatus in response to a movement speed of the apparatus being less than or equal to a first threshold.

The reducing module 503 is configured to reduce the idle-state-measurement frequency of the non-data card of the apparatus in response to the data transmission rate of the apparatus being greater than or equal to a second threshold.

The obtaining module 501 is further configured to obtain the movement speed of the apparatus in response to the data transmission rate of the apparatus being greater than or equal to the second threshold.

The reducing module 503 is further configured to reduce the idle-state-measurement frequency of the non-data card of the frequency adjusting device in response to the movement speed of apparatus being less than or equal to the first threshold.

The obtaining module 501 is further configured to obtain a measurement parameter, where the measurement parameter indicates the number of frequency points, N, measured by the non-data card of the apparatus in each idle mode DRX cycle.

The control module 504 is configured to control the apparatus to complete measurement of the N frequency points in N DRX cycles, in response to a movement speed of the apparatus being less than or equal to a first threshold and/or a data transmission rate of the apparatus being greater than or equal to a second threshold.

The control module 504 is further configured to control the apparatus to complete measurement of the N frequency points in one DRX cycle, in response to the movement speed of the apparatus being greater than the first threshold and/or the data transmission rate of the apparatus being less than the second threshold in a preset time period.

The lower the idle-state-measurement frequency of the non-data card of the apparatus, the higher the data transmission rate of the data card of the apparatus.

The apparatus for data transmission above may be, for example, a chip or a chip module. The modules included in the apparatuses and products described in above implementations may be software modules or hardware modules, or may be partly software modules and partly hardware modules. For example, the modules included in the apparatuses and products applied to or integrated in the chip may be implemented by hardware such as circuits, or at least some of the modules may be implemented by software programs that run on a processor integrated inside the chip, the remaining modules (if any) may be implemented by hardware such as circuits. The modules included in the apparatuses and products applied to or integrated in the chip module may be implemented by hardware such as circuits, different modules may be located in the same component, such as a chip, a circuit module, etc., or in different components of the chip module, or at least some of the modules may be implemented by software programs that run on a processor integrated inside the chip module, the remaining modules (if any) may be implemented by hardware such as circuits. The modules included in the apparatuses and products applied to or integrated in a terminal may be implemented by hardware such as circuits, different modules may be located in the same component, such as a chip, a circuit module, etc., or in different components in the terminal, or at least some of the modules may be implemented by software programs that run on a processor integrated inside the terminal, and the remaining modules (if any) may be implemented by hardware such as circuits.

In implementations of the disclosure, the obtaining module 501 obtains the state information, and determines the idle-state-measurement frequency of the non-data card according to the movement state and/or the service state indicated in the state information. When the movement state and/or the service state satisfy the preset condition, the apparatus can reduce the idle-state-measurement frequency of the non-data card, which reduces the data transmission rate loss of the data card and improves the data transmission rate of the data card, thereby ensuring the user experience.

It can be understood that the functions of the modules in implementations can be implemented according to the method in FIG. 3 or FIGS. 4A to 4D in implementations above, and the specific implementation may refer to the method in FIG. 3 or FIGS. 4A to 4D, which will not be repeated herein.

Figure 6:
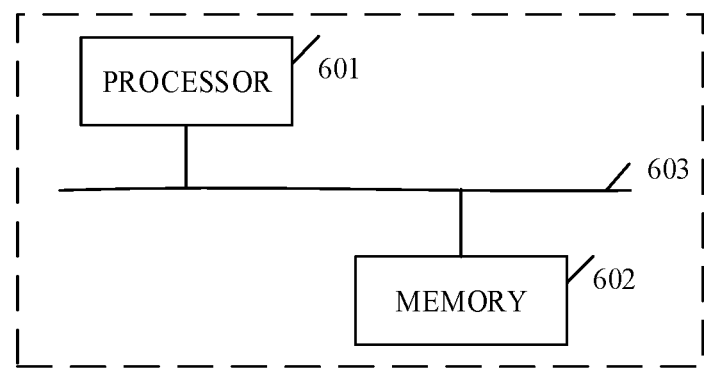
FIG. 6 is a schematic structural diagram of a terminal provided in implementations of the disclosure.

Referring to FIG. 6, FIG. 6 is a schematic structural diagram of a terminal provided in implementations of the disclosure. As illustrated in FIG. 6, the terminal in implementations includes a processor 601 and a memory 602. The processor 601 and the memory 602 are coupled via a bus 603.

The above processor 601 may be a central processing unit (CPU), or other general-purpose processors, digital signal processors (DSP), application specific integrated circuits (ASIC), field-programmable gate arrays (FPGA), or other programmable logic devices, discrete gate or transistor logic devices, discrete hardware components, etc. The general-purpose processor may be a microprocessor or any conventional processor.

The memory 602 may include a read-only memory (ROM) and a random-access memory (RAM) and provide computer programs and data to the processor 601. A portion of the memory 602 may also include a non-volatile RAM. When invoking the computer programs, the processor 601 is configured to obtain state information of the terminal, where the state information indicates a movement state and/or a service state of the terminal, and adjust an idle-state-measurement frequency of a non-data card of the terminal according to the state information of the terminal.

Optionally, the state information includes a movement speed and/or a data transmission rate of the terminal, and the processor 601 is further configured to obtain the data transmission rate of the terminal in response to the movement speed of the terminal being less than or equal to a first threshold, and reduce the idle-state-measurement frequency of the non-data card of the terminal in response to the data transmission rate of the terminal being greater than or equal to a second threshold.

Optionally, the state information includes a movement speed and/or a data transmission rate of the terminal, and the processor 601 is further configured to obtain the movement speed of the terminal in response to the data transmission rate of the terminal being greater than or equal to a second threshold, and reduce the idle-state-measurement frequency of the non-data card of the terminal in response to the movement speed of the terminal being less than or equal to a first threshold.

Optionally, the processor 601 is further configured to obtain a measurement parameter, where the measurement parameter indicates the number of frequency points, N, measured by the non-data card of the terminal in each idle-mode DRX cycle.

Optionally, the processor 601 is further configured to control the terminal to complete measurement of N frequency points in N DRX cycles, in response to a movement speed of the terminal being less than or equal to a first threshold and/or a data transmission rate of the terminal being greater than or equal to a second threshold.

Optionally, the processor 601 is further configured to control the terminal to complete measurement of the N frequency points in one DRX cycle, in response to the movement speed of the terminal being greater than the first threshold and/or the data transmission rate of the terminal being less than the second threshold in a preset time period.

Optionally, the lower the idle-state-measurement frequency of the non-data card of the terminal, the higher a data transmission rate of a data card of the terminal.

In a specific implementation, the processor 601 and the memory 602 described in implementations of the disclosure may implement implementation manners described in the flow of the method for frequency adjustment illustrated in FIG. 3 or FIGS. 4A to 4D in implementations of the disclosure, or may also implement implementation manners described in the apparatus for frequency adjustment illustrated in FIG. 5 in implementations of the disclosure, which will not be repeated herein.

In implementations of the disclosure, the processor 601 obtains the state information, and determines the idle-state-measurement frequency of the non-data card according to the movement state and/or the service state indicated in the state information. When the movement state and the service state satisfy the preset condition, the terminal can reduce the idle-state-measurement frequency of the non-data card, which reduces the data transmission rate loss of the data card and improves the data transmission rate of the data card, thereby ensuring the user experience.

Implementations of the disclosure provide a chip. The chip can perform relevant steps of the terminal in foregoing method implementations. The chip is configured to obtain state information of the chip, where the state information indicates a movement state and/or a service state of the chip, and adjust an idle-state-measurement frequency of a non-data card of the chip according to the state information of the chip.

Optionally, the state information includes a movement speed and/or a data transmission rate of the chip, and the chip is further configured to obtain the data transmission rate of the chip in response to the movement speed of the chip being less than or equal to a first threshold, and reduce the idle-state-measurement frequency of the non-data card of the chip in response to the data transmission rate of the chip being greater than or equal to a second threshold.

Optionally, the state information includes a movement speed and/or a data transmission rate of the chip, and the chip is further configured to obtain the movement speed of the chip in response to the data transmission rate of the chip being greater than or equal to a second threshold, and reduce the idle-state-measurement frequency of the non-data card of the chip in response to the movement speed of the chip being less than or equal to a first threshold.

Optionally, the chip is further configured to obtain a measurement parameter, where the measurement parameter indicates the number of frequency points, N, measured by the non-data card of the chip in each idle mode DRX cycle.

Optionally, the chip is further configured to control the chip to complete measurement of N frequency points in N DRX cycles, in response to a movement speed of the chip being less than or equal to a first threshold and/or a data transmission rate of the chip being greater than or equal to a second threshold.

Optionally, the chip is further configured to control the chip to complete measurement of the N frequency points in one DRX cycle, in response to the movement speed of the chip being greater than the first threshold and/or the data transmission rate of the chip being less than the second threshold in a preset time period.

Optionally, the lower the idle-state-measurement frequency of the non-data card of the chip, the higher a data transmission rate of a data card of the chip.

Relevant content of these implementations may refer to relevant content of foregoing method implementations, which will not be repeated herein. These implementations of the disclosure and foregoing method implementations are based on the same concept, and bring about the same technical effects. For specific principles, reference may be made to the description of foregoing method implementations, which will not be repeated herein.

Implementations of the disclosure provide a module device. The module device includes a processor and a communication interface coupled with the processor. The communication interface is configured to transmit and receive signals. The processor is configured to obtain state information of the module device, where the state information indicates a movement state and/or a service state of the module device, and adjust an idle-state-measurement frequency of a non-data card of the module device according to the state information of the module device.

Optionally, the state information includes a movement speed and/or a data transmission rate of the module device, and the processor is further configured to obtain the data transmission rate of the module device in response to the movement speed of the module device being less than or equal to a first threshold, and reduce the idle-state-measurement frequency of the non-data card of the module device in response to the data transmission rate of the module device being greater than or equal to a second threshold.

Optionally, the state information includes a movement speed and/or a data transmission rate of the module device, and the processor is further configured to obtain the movement speed of the module device in response to the data transmission rate of the module device being greater than or equal to a second threshold, and reduce the idle-state-measurement frequency of the non-data card of the module device in response to the movement speed of the module device being less than or equal to a first threshold.

Optionally, the processor is further configured to obtain a measurement parameter, where the measurement parameter indicates the number of frequency points, N, measured by the non-data card of the module device in each idle mode DRX cycle.

Optionally, the processor is further configured to control the module device to complete measurement of N frequency points in N DRX cycles, in response to a movement speed of the module device being less than or equal to a first threshold and/or a data transmission rate of the module device being greater than or equal to a second threshold.

Optionally, the processor is further configured to control the module device to complete measurement of the N frequency points in one DRX cycle, in response to the movement speed of the module device being greater than the first threshold and/or the data transmission rate of the module device being less than the second threshold in a preset time period.

Optionally, the lower the idle-state-measurement frequency of the non-data card of the module device, the higher a data transmission rate of a data card of the module device.

Relevant content of these implementations may refer to relevant content of foregoing method implementations, which will not be repeated herein. These implementations of the disclosure and foregoing method implementations are based on the same concept, and bring about the same technical effects. For specific principles, reference may be made to the description of foregoing method implementations, which will not be repeated herein.

Implementations of the disclosure further provide a computer-readable storage medium. The computer-readable storage medium stores computer programs. The computer programs include program instructions. When executed by a processor, the program instructions are configured to perform the steps in the method for frequency adjustment in implementations illustrated in FIG. 3 or FIGS. 4A to 4D.

Those of ordinary skill in the art can understand that all or part of the processes in the method implementations above can be implemented by instructing relevant hardware through computer programs, and the programs can be stored in a computer-readable storage medium. When executed, the programs are configured to implement flows in the method implementations. The storage medium may be a magnetic disk, an optical disk, a ROM, a RAM, etc.

Some preferred implementations of the disclosure are disclosed above, which cannot limit the scope of the disclosure. Those skilled in the art can understand and implement all or part of the processes of the above implementations, and equivalent changes made according to the claims of the disclosure shall still fall within the scope of the disclosure.

Implementations of the disclosure provide a method for frequency adjustment. According to the method, an idle-state-measurement frequency of a non-data card can be reduced according to state information of a terminal, which helps to reduce the data transmission rate loss of a data card, thereby improving the data transmission rate of the data card and ensuring the user experience.

In a first aspect, implementations of the disclosure provide a method for frequency adjustment. The method includes: obtaining state information of a terminal, where the state information indicates a movement state and/or a service state of the terminal, and adjusting an idle-state-measurement frequency of a non-data card of the terminal according to the state information of the terminal.

In implementations of the disclosure, the terminal obtains the state information of the terminal, where the state information indicates the movement state and/or the service state of the terminal, and reduces the idle-state-measurement frequency of the non-data card of the terminal according to the state information of the terminal, thereby reducing the data transmission rate loss of the data card, improving the data transmission rate of the data card, and ensuring the user experience.

With reference to the first aspect, in some possible implementations, the state information includes a movement speed and/or a data transmission rate of the terminal, and adjusting the idle-state-measurement frequency of the non-data card of the terminal according to the state information of the terminal includes: obtaining the data transmission rate of the terminal in response to the movement speed of the terminal being less than or equal to a first threshold, and reducing the idle-state-measurement frequency of the non-data card of the terminal in response to the data transmission rate of the terminal being greater than or equal to a second threshold.

With reference to the first aspect, in some possible implementations, the state information includes a movement speed and/or a data transmission rate of the terminal, and adjusting the idle-state-measurement frequency of the non-data card of the terminal according to the state information of the terminal includes: obtaining the movement speed of the terminal in response to the data transmission rate of the terminal being greater than or equal to a second threshold, and reducing the idle-state-measurement frequency of the non-data card of the terminal in response to the movement speed of the terminal being less than or equal to a first threshold.

With reference to the first aspect, in some possible implementations, the method further includes: obtaining a measurement parameter, where the measurement parameter indicates the number of frequency points, N, measured by the non-data card of the terminal in each idle mode discontinuous reception (DRX) cycle.

With reference to the first aspect, in some possible implementations, adjusting the idle-state-measurement frequency of the non-data card of the terminal according to the state information of the terminal includes: controlling the terminal to complete measurement of N frequency points in N DRX cycles, in response to a movement speed of the terminal being less than or equal to a first threshold and/or a data transmission rate of the terminal being greater than or equal to a second threshold.

With reference to the first aspect, in some possible implementations, the method further includes: controlling the terminal to complete measurement of the N frequency points in one DRX cycle, in response to the movement speed of the terminal being greater than the first threshold and/or the data transmission rate of the terminal being less than the second threshold in a preset time period.

With reference to the first aspect, in some possible implementations, the lower the idle-state-measurement frequency of the non-data card of the terminal, the higher a data transmission rate of a data card of the terminal.

In a second aspect, implementations of the disclosure provide an apparatus for frequency adjustment. The apparatus includes an obtaining module and an adjustment module. The obtaining module is configured to obtain state information of the apparatus, where the state information indicates a movement state and/or a service state of the apparatus. The adjustment module is configured to adjust an idle-state-measurement frequency of a non-data card of the apparatus according to the state information of the apparatus.

With reference to the second aspect, in some possible implementations, the state information includes a movement speed and/or a data transmission rate of the apparatus, and adjusting, by the adjustment module, the idle-state-measurement frequency of the non-data card of the apparatus according to the state information of the apparatus includes: obtaining the data transmission rate of the apparatus in response to the movement speed of the apparatus being less than or equal to a first threshold, and reducing the idle-state-measurement frequency of the non-data card of the apparatus in response to the data transmission rate of the apparatus being greater than or equal to a second threshold.

With reference to the second aspect, in some possible implementations, the state information includes a movement speed and/or a data transmission rate of the apparatus, and adjusting, by the adjustment module, the idle-state-measurement frequency of the non-data card of the apparatus according to the state information of the apparatus includes: obtaining the movement speed of the apparatus in response to the data transmission rate of the apparatus being greater than or equal to a second threshold, and reducing the idle-state-measurement frequency of the non-data card of the apparatus in response to the movement speed of the apparatus being less than or equal to a first threshold.

With reference to the second aspect, in some possible implementations, the obtaining module of the apparatus is further configured to obtain a measurement parameter, where the measurement parameter indicates the number of frequency points, N, measured by the non-data card of the apparatus in each idle mode DRX cycle.

With reference to the second aspect, in some possible implementations, adjusting, by the adjustment module, the idle-state-measurement frequency of the non-data card of the apparatus according to the state information of the apparatus includes: controlling the apparatus to complete measurement of the N frequency points in N DRX cycles, in response to a movement speed of the apparatus being less than or equal to a first threshold and/or a data transmission rate of the apparatus being greater than or equal to a second threshold.

With reference to the second aspect, in some possible implementations, the adjustment module is further configured to control the apparatus to complete measurement of the N frequency points in one DRX cycle, in response to the movement speed of the terminal being greater than the first threshold and/or the data transmission rate of the terminal being less than the second threshold in a preset time period.

With reference to the second aspect, in some possible implementations, the lower the idle-state-measurement frequency of the non-data card of the apparatus, the higher a data transmission rate of a data card of the apparatus.

In a third aspect, implementations of the disclosure provide a terminal. The terminal includes a processor and a memory coupled with the processor, where the memory is configured to store program codes, and the processor is configured to invoke the program codes to perform the method of the first aspect.

In a fourth aspect, implementations of the disclosure provide a chip. The chip is configured to obtain state information of the chip, where the state information indicates a movement state and/or a service state of the chip, and adjust an idle-state-measurement frequency of a non-data card of the chip according to the state information of the chip.

In a fifth aspect, implementations of the disclosure provide a module device. The module device includes a processor and a communication interface coupled with the communication interface. The communication interface is configured to transmit and receive signals. The processor is configured to obtain state information of the module device, where the state information indicates a movement state and/or a service state of the module device, and adjust an idle-state-measurement frequency of a non-data card of the module device according to the state information of the module device.

In a sixth aspect, implementations of the disclosure provide a computer-readable storage medium. The computer-readable storage medium stores computer programs, which when executed by a processor, are configured to perform the method of the first aspect.

What is claimed is:

1. A method for frequency adjustment, comprising:
    obtaining state information of a terminal, the state information indicating a movement state and/or a service state of the terminal; and
    adjusting an idle-state-measurement frequency of a non-data card of the terminal according to the state information of the terminal,
    wherein adjusting the idle-state-measurement frequency of the non-data card of the terminal according to the state information of the terminal comprises:
        controlling the terminal to complete measurement of N frequency points in N DRX (discontinuous reception) cycles, in response to a movement speed of the terminal being less than or equal to a first threshold and/or a data transmission rate of the terminal being greater than or equal to a second threshold.

2. The method of claim 1, wherein the state information comprises a movement speed and/or a data transmission rate of the terminal, and
    adjusting the idle-state-measurement frequency of the non-data card of the terminal according to the state information of the terminal comprises:
        obtaining the data transmission rate of the terminal in response to the movement speed of the terminal being less than or equal to a first threshold; and
        reducing the idle-state-measurement frequency of the non-data card of the terminal in response to the data transmission rate of the terminal being greater than or equal to a second threshold.

3. The method of claim 1, wherein the state information comprises a movement speed and/or a data transmission rate of the terminal; and adjusting the idle-state-measurement frequency of the non-data card of the terminal according to the state information of the terminal comprises:
obtaining the movement speed of the terminal in response to the data transmission rate of the terminal being greater than or equal to a second threshold; and
reducing the idle-state-measurement frequency of the non-data card of the terminal in response to the movement speed of the terminal being less than or equal to a first threshold.

4. The method of claim 1, further comprising:
obtaining a measurement parameter, the measurement parameter indicating a number of frequency points, N, measured by the non-data card of the terminal in each idle mode discontinuous reception (DRX) cycle.

5. The method of claim 1, further comprising:
controlling the terminal to complete measurement of the N frequency points in one DRX cycle, in response to the movement speed of the terminal being greater than the first threshold and/or the data transmission rate of the terminal being less than the second threshold in a preset time period.

6. The method of claim 1, wherein lower the idle-state-measurement frequency of the non-data card of the terminal, higher a data transmission rate of a data card of the terminal.

7. A terminal comprising:
a memory configured to store one or more programs; and
a processor configured to invoke and execute the one or more programs to:
obtain state information of the terminal, the state information indicating a movement state and/or a service state of the terminal; and
adjust an idle-state-measurement frequency of a non-data card of the terminal according to the state information of the terminal,
wherein the processor is further configured:
control the terminal to complete measurement of N frequency points in N DRX (discontinuous reception) cycles, in response to a movement speed of the terminal being less than or equal to a first threshold and/or a data transmission rate of the terminal being greater than or equal to a second threshold.

8. The terminal of claim 7, wherein the state information comprises a movement speed and/or a data transmission rate of the terminal, and the processor is further configured to:
obtain the data transmission rate of the terminal in response to the movement speed of the terminal being less than or equal to a first threshold; and
reduce the idle-state-measurement frequency of the non-data card of the terminal in response to the data transmission rate of the terminal being greater than or equal to a second threshold.

9. The terminal of claim 7, wherein the state information comprises a movement speed and/or a data transmission rate of the terminal; and the processor is further configured to:
obtain the movement speed of the terminal in response to the data transmission rate of the terminal being greater than or equal to a second threshold; and
reduce the idle-state-measurement frequency of the non-data card of the terminal in response to the movement speed of the terminal being less than or equal to a first threshold.

10. The terminal of claim 7, wherein the processor is further configured to:
obtain a measurement parameter, the measurement parameter indicating a number of frequency points, N, measured by the non-data card of the terminal in each idle mode discontinuous reception (DRX) cycle.

11. The terminal of claim 7, wherein the processor is further configured to:
control the terminal to complete measurement of the N frequency points in one DRX cycle, in response to the movement speed of the terminal being greater than the first threshold and/or the data transmission rate of the terminal being less than the second threshold in a preset time period.

12. The terminal of claim 7, wherein lower the idle-state-measurement frequency of the non-data card of the terminal, higher a data transmission rate of a data card of the terminal.

13. A non-transitory computer-readable storage medium storing computer programs which are operable with a processor to:
obtain state information of a terminal, the state information indicating a movement state and/or a service state of the terminal; and
adjust an idle-state-measurement frequency of a non-data card of the terminal according to the state information of the terminal,
wherein the computer programs are further operable with the processor to:
control the terminal to complete measurement of N frequency points in N DRX (discontinuous reception) cycles, in response to a movement speed of the terminal being less than or equal to a first threshold and/or a data transmission rate of the terminal being greater than or equal to a second threshold.

14. The non-transitory computer-readable storage medium of claim 13, wherein the state information comprises a movement speed and/or a data transmission rate of the terminal, and the computer programs are further operable with the processor to:
obtain the data transmission rate of the terminal in response to the movement speed of the terminal being less than or equal to a first threshold; and
reduce the idle-state-measurement frequency of the non-data card of the terminal in response to the data transmission rate of the terminal being greater than or equal to a second threshold.

15. The non-transitory computer-readable storage medium of claim 13, wherein the state information comprises a movement speed and/or a data transmission rate of the terminal; and the computer programs are further operable with the processor to:
obtain the movement speed of the terminal in response to the data transmission rate of the terminal being greater than or equal to a second threshold; and
reduce the idle-state-measurement frequency of the non-data card of the terminal in response to the movement speed of the terminal being less than or equal to a first threshold.

16. The non-transitory computer-readable storage medium of claim 13, wherein the computer programs are further operable with the processor to:
obtain a measurement parameter, the measurement parameter indicating a number of frequency points, N, measured by the non-data card of the terminal in each idle mode discontinuous reception (DRX) cycle.

17. The non-transitory computer-readable storage medium of claim 13, wherein the computer programs are further operable with the processor to:
control the terminal to complete measurement of the N frequency points in one DRX cycle, in response to the movement speed of the terminal being greater than the first threshold and/or the data transmission rate of the terminal being less than the second threshold in a preset time period.

\* \* \* \* \*